US 6,985,466 B1

(12) United States Patent
Yun et al.

(10) Patent No.: US 6,985,466 B1
(45) Date of Patent: Jan. 10, 2006

(54) DOWNLINK SIGNAL PROCESSING IN CDMA SYSTEMS UTILIZING ARRAYS OF ANTENNAE

(75) Inventors: Louis C. Yun, Milpitas, CA (US); Mitchell D. Trott, Mountain View, CA (US)

(73) Assignee: ArrayComm, Inc., San Jose, CA (US)

( * ) Notice: Subject to any disclaimer, the term of this patent is extended or adjusted under 35 U.S.C. 154(b) by 0 days.

(21) Appl. No.: 09/437,764

(22) Filed: Nov. 9, 1999

(51) Int. Cl.
*H04B 7/216* (2006.01)
*H04Q 7/00* (2006.01)

(52) U.S. Cl. .................... 370/335; 370/331; 455/438
(58) Field of Classification Search ............... 370/335, 370/342, 331, 329, 341, 310, 328, 339, 336; 455/436–444, 450–451, 452.1, 452.2, 513, 455/59, 60, 69, 121, 522; 342/74, 81, 157, 342/367, 368; 343/824; 375/219, 267
See application file for complete search history.

(56) References Cited

U.S. PATENT DOCUMENTS

| | | | |
|---|---|---|---|
| 3,704,465 A | 11/1972 | Masak et al. | |
| 3,774,209 A | 11/1973 | Fleming et al. | |
| 3,798,645 A | 3/1974 | Baurle et al. | |
| 3,852,749 A | 12/1974 | Kohler | |

(Continued)

FOREIGN PATENT DOCUMENTS

| | | |
|---|---|---|
| EP | 0 639 035 A1 | 2/1995 |
| EP | 0 713 261 A1 | 5/1996 |
| EP | 0 777 400 A2 | 6/1997 |
| GB | 2 237 706 A | 5/1991 |

(Continued)

OTHER PUBLICATIONS

D. Gerlach and A. Paulraj. Base Station Transmitter Antenna Arrays with Mobile to Base Feedback. Singals, Systems and Computers. 1993 IEEE. pp. 1432–1436.*
D. Gerlach. Transmit Antenna Beamforming for the Advanced Mobile Phone System. Proceedings of ASILO-MAR-29. 1996 IEEE. pp. 1162–1166.*
D. Gerlach and A. Paulraj. Adaptive Transmitting Arrays with Feedback. IEEE Signal Processing Letters, vol. 1, No. 10, Oct. 1994.*
European Examination Report dated Oct. 18, 2002.
Acampora et al., "A New Adaptive MAC Layer Protocol for Wireless ATM Networks In Harsh Fading and Interference Environments", 1997 IEEE, pp. 410–415.
Agee, "Blind Separation and Capture of Communications Signals Using A Multitarget Constant Modulus Beamformer", Oct. 7, 1989 Proc. IEEE Military Communications Conference, vol. 2, pp. 1–12.

(Continued)

*Primary Examiner*—Steven Nguyen
(74) *Attorney, Agent, or Firm*—Blakely, Sokoloff, Taylor & Zafman, LLP (57) ABSTRACT

The present invention is a method for operating a base station (BS) for transmitting information to a subscriber unit (SU) in a cellular communication system. The information is included in a downlink signal sent from a signal processing circuit through an array of antennae. The processing depends on a weight set that is utilized in generating individual signals to be sent on individual antennae in the array to the SU. The weight set is determined by transmitting a plurality of pilot downlink signals from BS to the SU, each pilot downlink signal being processed with a different weight set than that used to process the other pilot downlink signals. Report signals are received for each of the pilot downlink signals and are compared to determine which weight set should be utilized. The present invention may be practiced within existing CDMA cellular standards such as the IS-95 standard.

34 Claims, 1 Drawing Sheet

U.S. PATENT DOCUMENTS

| | | |
|---|---|---|
| 3,946,385 A | 3/1976 | Ewen |
| 4,005,379 A | 1/1977 | Lerner |
| 4,035,746 A | 7/1977 | Covington, Jr. |
| 4,085,319 A | 4/1978 | Deitz et al. |
| 4,128,740 A | 12/1978 | Graziano |
| 4,146,889 A * | 3/1979 | Brennan et al. ............ 343/5 R |
| 4,263,568 A | 4/1981 | Nemit |
| 4,316,191 A | 2/1982 | Sawatari et al. |
| 4,375,622 A | 3/1983 | Hollingsworth et al. |
| 4,434,505 A | 2/1984 | Gutleber |
| 4,475,010 A | 10/1984 | Huensch et al. |
| 4,626,859 A | 12/1986 | Stansfield |
| 4,639,732 A | 1/1987 | Acoraci et al. |
| 4,639,914 A | 1/1987 | Winters |
| 4,658,096 A | 4/1987 | West, Jr. et al. |
| 4,737,794 A | 4/1988 | Jones |
| 4,737,975 A | 4/1988 | Shafer |
| 4,742,356 A | 5/1988 | Kuipers |
| 4,750,147 A | 6/1988 | Roy, III et al. |
| 4,775,997 A | 10/1988 | West, Jr. et al. |
| 4,796,291 A | 1/1989 | Makino |
| 4,827,395 A | 5/1989 | Anders et al. |
| 4,829,554 A | 5/1989 | Barnes et al. |
| 4,837,800 A | 6/1989 | Freeburg et al. |
| 4,855,748 A | 8/1989 | Brandao et al. |
| 4,910,794 A | 3/1990 | Mahany |
| 4,922,517 A | 5/1990 | West, Jr. et al. |
| 4,926,186 A | 5/1990 | Kelly et al. |
| 4,940,963 A | 7/1990 | Gutman et al. |
| 4,947,452 A | 8/1990 | Hattori et al. |
| 4,955,082 A | 9/1990 | Hattori et al. |
| 4,965,732 A | 10/1990 | Roy, III et al. |
| 4,965,849 A | 10/1990 | Kunihiro |
| 4,965,850 A | 10/1990 | Schloemer |
| 4,972,151 A | 11/1990 | Rosen |
| 4,989,204 A | 1/1991 | Shimizu et al. |
| 5,041,833 A | 8/1991 | Weinberg |
| 5,052,799 A | 10/1991 | Sasser et al. |
| 5,093,924 A | 3/1992 | Toshiyuki et al. |
| 5,103,459 A | 4/1992 | Gilhousen et al. |
| 5,109,535 A | 4/1992 | Kume et al. |
| 5,124,697 A | 6/1992 | Moore |
| 5,142,253 A | 8/1992 | Mallavarpu et al. |
| 5,159,593 A | 10/1992 | D'Amico et al. |
| 5,255,210 A | 10/1993 | Gardner et al. |
| 5,260,968 A | 11/1993 | Gardner et al. |
| 5,262,789 A | 11/1993 | Silverstein |
| 5,267,261 A * | 11/1993 | Blakeney et al. ............ 370/335 |
| 5,274,844 A | 12/1993 | Harrison et al. |
| 5,283,540 A | 2/1994 | Myer |
| 5,299,148 A | 3/1994 | Gardner et al. |
| 5,335,249 A | 8/1994 | Krueger et al. |
| 5,345,596 A | 9/1994 | Buchenhorner et al. |
| 5,361,303 A | 11/1994 | Eatwell |
| 5,367,559 A | 11/1994 | Kay et al. |
| 5,379,320 A | 1/1995 | Fernandes et al. |
| 5,387,915 A | 2/1995 | Moussa et al. |
| 5,423,072 A | 6/1995 | Iwashita et al. |
| 5,430,760 A | 7/1995 | Dent |
| 5,440,281 A | 8/1995 | Wey et al. |
| 5,448,621 A | 9/1995 | Knudsen |
| 5,457,812 A | 10/1995 | Siira et al. |
| 5,465,399 A | 11/1995 | Oberholtzer et al. |
| 5,471,647 A | 11/1995 | Gerlach et al. |
| 5,475,864 A | 12/1995 | Hamabe |
| 5,475,868 A | 12/1995 | Duque-Anton et al. |
| 5,497,505 A | 3/1996 | Koohgoli et al. |
| 5,499,387 A * | 3/1996 | Chambert ............ 455/436 |
| 5,515,378 A | 5/1996 | Roy, III et al. |
| 5,530,449 A | 6/1996 | Wachs et al. |
| 5,530,917 A | 6/1996 | Andersson et al. |
| 5,532,706 A | 7/1996 | Reinhardt et al. |
| 5,537,438 A | 7/1996 | Mourot et al. |
| 5,543,801 A | 8/1996 | Shawyer |
| 5,546,090 A | 8/1996 | Roy, III et al. |
| 5,548,813 A | 8/1996 | Charas et al. |
| 5,553,074 A | 9/1996 | Acampora |
| 5,555,445 A | 9/1996 | Booth |
| 5,557,657 A | 9/1996 | Barnett |
| 5,565,873 A | 10/1996 | Dean |
| 5,566,209 A | 10/1996 | Forssen et al. |
| 5,576,717 A | 11/1996 | Searle et al. |
| 5,592,490 A | 1/1997 | Barratt et al. |
| 5,596,625 A | 1/1997 | LeBlanc |
| 5,603,082 A | 2/1997 | Hamabe |
| 5,603,089 A | 2/1997 | Searle et al. |
| 5,606,729 A | 2/1997 | D'Amico et al. |
| 5,615,409 A | 3/1997 | Forssen et al. |
| 5,621,752 A | 4/1997 | Antonio et al. |
| 5,625,885 A | 4/1997 | Nakazawa et al. |
| 5,634,199 A * | 5/1997 | Gerlach et al. ............ 455/63 |
| 5,638,375 A | 6/1997 | Dettro et al. |
| 5,649,287 A | 7/1997 | Forssen et al. |
| 5,673,291 A | 9/1997 | Dent |
| 5,675,581 A | 10/1997 | Soliman |
| 5,678,188 A | 10/1997 | Hisamura |
| 5,684,836 A | 11/1997 | Nagayasu et al. |
| 5,689,219 A | 11/1997 | Piirainen |
| 5,689,502 A | 11/1997 | Scott |
| 5,694,416 A | 12/1997 | Johnson |
| 5,697,066 A | 12/1997 | Acampora |
| 5,726,978 A | 3/1998 | Frodigh et al. |
| 5,732,076 A | 3/1998 | Ketseoglou et al. |
| 5,742,904 A | 4/1998 | Pinder et al. |
| 5,745,858 A | 4/1998 | Sato et al. |
| 5,748,676 A | 5/1998 | Mahany |
| 5,752,165 A | 5/1998 | Hokkanen |
| 5,774,461 A | 6/1998 | Hyden et al. |
| 5,781,845 A * | 7/1998 | Dybdal et al. ............ 455/65 |
| 5,809,009 A | 9/1998 | Matsuoka et al. |
| 5,809,019 A | 9/1998 | Ichihara et al. |
| 5,818,918 A | 10/1998 | Fujii |
| 5,819,182 A | 10/1998 | Gardner et al. |
| 5,825,762 A | 10/1998 | Kamin, Jr. et al. |
| 5,828,658 A | 10/1998 | Ottersten et al. |
| 5,845,212 A | 12/1998 | Tanaka |
| 5,867,123 A | 2/1999 | Geyh et al. |
| 5,884,148 A | 3/1999 | Bilgic et al. |
| 5,886,987 A * | 3/1999 | Yoshida et al. ............ 370/335 |
| 5,887,038 A | 3/1999 | Golden |
| 5,905,721 A | 5/1999 | Liu et al. |
| 5,909,470 A | 6/1999 | Barratt et al. |
| 5,914,946 A | 6/1999 | Avidor et al. |
| 5,930,243 A | 7/1999 | Parish et al. |
| 5,933,421 A | 8/1999 | Alamouti et al. |
| 5,940,743 A * | 8/1999 | Sunay et al. ............ 370/335 |
| 5,955,992 A | 9/1999 | Shattil |
| 5,960,350 A * | 9/1999 | Schorman et al. ............ 455/513 |
| 5,970,394 A | 10/1999 | Arpee et al. |
| 5,973,638 A | 10/1999 | Robbins et al. |
| 5,982,758 A * | 11/1999 | Hamdy ............ 370/331 |
| 5,999,826 A | 12/1999 | Whinnett |
| 6,005,854 A | 12/1999 | Xu et al. |
| 6,009,124 A | 12/1999 | Smith et al. |
| 6,018,317 A | 1/2000 | Dogan et al. |
| 6,018,555 A | 1/2000 | Mahany |
| 6,018,643 A | 1/2000 | Golemon et al. |
| 6,023,203 A | 2/2000 | Parish |
| 6,049,716 A * | 4/2000 | Jung ............ 455/442 |
| 6,061,553 A | 5/2000 | Matsuoka et al. |
| 6,064,865 A | 5/2000 | Kuo et al. |

| | | | | |
|---|---|---|---|---|
| 6,067,324 A | * | 5/2000 | Harrison | 375/219 |
| 6,075,989 A | * | 6/2000 | Moore et al. | 455/436 |
| 6,108,565 A | | 8/2000 | Scherzer | |
| 6,122,260 A | | 9/2000 | Liu et al. | |
| 6,122,266 A | * | 9/2000 | Lynch | 370/335 |
| 6,131,016 A | | 10/2000 | Greenstein et al. | |
| 6,154,661 A | | 11/2000 | Goldburg | |
| 6,185,412 B1 | | 2/2001 | Pentikainen et al. | |
| 6,192,256 B1 | | 2/2001 | Whinnett | |
| 6,195,552 B1 | * | 2/2001 | Jeong et al. | 455/436 |
| 6,233,466 B1 | * | 5/2001 | Wong et al. | 455/562 |
| 6,272,122 B1 | * | 8/2001 | Wee | 370/342 |
| 6,415,149 B1 | * | 7/2002 | Bevan et al. | 455/438 |
| 6,556,551 B1 | * | 4/2003 | Schwartz | 370/331 |

FOREIGN PATENT DOCUMENTS

| | | |
|---|---|---|
| GB | 2 295 524 A | 5/1996 |
| GB | 2 313 261 A | 11/1997 |
| JP | 7-170548 | 4/1995 |
| WO | 95/34103 | 12/1995 |
| WO | WO 97/02262 | 1/1997 |
| WO | WO 97/08849 | 3/1997 |
| WO | 98/01963 | 1/1998 |
| WO | 98/17037 | 4/1998 |
| WO | 98/17071 | 4/1998 |
| WO | 98/28864 | 7/1998 |
| WO | 98/33346 | 7/1998 |

OTHER PUBLICATIONS

Aschied et al., "An All Digital Receiver Architecture for Bandwidth Efficient Transmission at High Data Rates", 1989, IEEE Transactions on Communications, vol. 37, No. 8, pp. 804–813.

Franks, "Synchronization Subsystems: Analysis and Design", 1981, Digital Communications Satellite/Earth Station Engineering, pp. 294–335.

Friedlander, "Direction Finding Using an Interpolated Array", Apr. 30, 1990, International Conference on Acoustics, Speech, and Signal Processing, vol. 5, pp. 2951–2954.

Friedlander et al., "Direction Finding for Wideband Signals Using an Interpolated Array", 1991, IEEE Publication, pp. 583–587.

Ganz et al., "A Data–Derived Reference Signal Technique for Adaptive Arrays", IEEE Transactions on Communications, vol. 37, No. 9, Sep. 1989, pp. 975–983.

Iltis et al., "A Digital DS Spread–Spectrum Receiver With Joint Channel and Doppler Shift Estimation", IEEE Transactions on Communications, vol. 39, No. 8, Aug. 1991, pp. 1255–1267.

Krishnamurthy et al., "Polling Based Media Access Protocols For Use With Smart Adaptive Array Antennas", 1998 IEEE, pp. 337–344.

Lee et al., "Decision Directed Carrier Recovery—Chapter 16: Carrier Recovery", 1994 Digital Communications, 2nd Edition, Kluwer Academic Pub., pp. 725–736.

Lee et al., "Decision Directed Carrier Recovery—Chapter 17: Timing Recovery", 1994 Digital Communications, 2nd Edition, Kluwer Academic Pub., pp. 737–764.

Lundell et al., "Applications of the Constant Modulus Adaptive Beamformer to Constant and Non–Constant Modulus Signals", Proceedings, 1998 Asilomar Conference on Signals, Systems, and Computers (ACSSC–1988), pp. 432–436.

Muhamed et al., "Direction of Arrival Estimation Using Antenna Arrays", 1996, The Bradley Dept. of Electrical Engineering, Mobile and Portable Radio Research Group, Section 3.8, pp. 64–71.

vander Veen et al., "A Constant Modulus Factorization Technique for Smart Antenna Applications in Mobile Communications", SPIE 1994 "Advanced Signal Processing Algorithms, Architectures, and Implementations V", vol. 2296, pp. 230–241.

Talwar et al., "Rescursive Algorithms for Estimating Multiple Co–Channel Digital Signals Received at an Antenna Array", Proc. Fifth Annual IEEE Dual Use Technologies and Applications Conference.

Papadias et al., "A Space–Time Constant Modulus Algorithm for SDMA Systems", 1996, Proceedings, IEEE 46th Vehicular Technology Conference, pp. 86–90.

Talwar et al., "Blind Estimation of Multiple Co–Channel Digital Signals Arriving at an Antenna Array", 1993, Proc. 27th Asilomar Conference on Signals, Systems, and Computers, vol. 1, pp. 349–342.

Rashid–Farrokhi et al., "Joint Power Control and Beamforming for Capacity Improvement in Wireless Networks With Antenna Array", 1996 IEEE GLOBECOM 1996, vol. 1, pp. 555–559.

Rashid–Farrokhi et al., "Transmit Beamforming for Cellular Communication Systems", Conference on Informtion Science and Systems, CISS–97; Mar. 1997, 4 pages.

Rashid–Farrokhi et al., "Downlink and Uplink Capacity Enhancement in Power Controlled Cellular Systems", Proceedings, 1997 IEEE 47th Vehicular Technology Conference, vol. 2, 5/97, pp. 647–651.

Rashid–Farrokhi et al., "Downlink Power Control and Base Station Assignment", IEEE Communications Letters, vol. 1, No. 4, 07/97, pp. 102–104.

Rashid–Farrokhi et al., "Transmit Diversity and Equalization for Power Controlled Wireless Networks", Conference Record 31st Asilomar Conference on Signals, Systems, and Computers, vol. 1, 11/97, pp. 620–624.

Xu et al., "Throughput Multiplication of Wirless LANs for Multimedia Services: SDMA Protocol Design", 1994, IEEE, pp. 1326–1332.

Swidlehurst et al., "Analysis of a Decision Directed Beamformer", IEEE Transactions on Signal Processing, vol. 43, No. 12, 12/95, pp. 2920–2927.

Zhang et al., "Performance of a Modified Polling Strategy for Broadband Wireless LANs in a Harsh Fading Environment", 1991, GLOBECOM 1991, pp. 1141–1146.

US98/25364, PCT Search Report, May 11, 1999.

Farsakh et al., "A Real Time Downlink Channel Allocation Scheme For An SDMA Mobile Radio System," IEEE International Symposium on Personal, Indoor and Mobile Radio Communications, vol. 3, Oct. 18, 1996, pp. 1215–1220.

Farsakh et al., "Channel Allocation and Downlink Beamforming in an SDMA Mobile Radio System," PIMRC '95, Wireless: Merging onto the Inforamtion Superhighway, 6th IEEE International Symposium on Toronto, Ont., Canada, 9/27–29/95, pp. 687–691.

Ottersten, B., "Array Processing for Wireless Communications," Proc. 8th IEEE Signal Processing Workshop on Statistical Signal and Array Proc., Jun. 1996, pp. 466–473.

* cited by examiner

FIG. 1

DOWNLINK SIGNAL PROCESSING IN CDMA SYSTEMS UTILIZING ARRAYS OF ANTENNAE

FIELD OF THE INVENTION

This invention relates to the field of wireless communication systems, and more specifically, to a method for determining the proper communication parameters to be utilized by a communication station that uses a multiple element antenna array to reduce noise and interference in CDMA-based digital cellular and similar systems.

BACKGROUND OF THE INVENTION

The success of cellular telephone systems has led to increased demand. To provide the communication bandwidth needed to satisfy this increased demand, technologies have been developed that enable several conversations to occur simultaneously in a single frequency band. In time division multiple access (TDMA), each communication frequency is divided into "time slots", each time slot being used for a separate conversation. A second technique relies on code division multiple access (CDMA) to increase the number of users that can share any given communication frequency. In such systems each user encodes his or her transmissions with a code that is orthogonal, or nearly orthogonal, to the codes used by the other users of that communication frequency. In effect, the communication band is divided into a number of separate channels that can transmit information simultaneously. The maximum number of channels that can share any given communication frequency depends on the levels of interference and noise in each channel.

A significant fraction of the interference and noise experienced by each channel originates from the transmissions that are geographically localized such as transmissions from other users of the communication frequency. In the ideal case, the channels are perfectly separated, and hence, transmissions in one channel should not "leak" into the other channels. In the case of CDMA, the degree of channel isolation depends on a property of the codes used to encode the transmissions. Codes that are "orthogonal" to one another provide channels that do not leak into one another. Unfortunately, even in those cases in which mathematically orthogonal codes are utilized, the implementation of those codes on commercially feasible equipment and the dispersive nature of the propagation environment lead to some interchannel leakage. In effect, the imperfect electronics and propagation environment converts even perfectly orthogonal codes to codes that are only nearly orthogonal One method for reducing the interchannel leakage is to utilize "adaptive smart antenna processing" to discriminate against interference and noise sources that are at geographically distinct locations with respect to the signal source of interest. Adaptive smart antenna processing utilize arrays of antennae together with adaptive signal processing to reduce the apparent signal strength from interference sources that are geographically separated from the cellular user of interest while enhancing the signal from that user. Consider two CDMA cellular users that are transmitting on the same frequency with different codes. As noted above, each user's signal will "leak" into the other user's communication channel. If sufficient distance separates the users from each other, and the antennae complex utilizes adaptive smart antenna processing, then the cell can be configured to transmit and receive in a spatially selective manner that reduces the interchannel leakage. In such a system, the base station (BS) configures the antennae complex to aim its signals to the first user when sending signals to that user and to receive signals preferentially from the location of that user. The transmission and reception pattern is also chosen such that there is a null region at the location of the second user. That is, the transmission energy received at the location of the second user is much lower than that received at the location of the first user when the BS is transmitting to the first user. Similarly, the apparent signal strength of the second user is significantly reduced when the BS is configured to listen to the first user. Hence, even if a small fraction of the second user's signal leaks into the first user's channel, the leakage is substantially reduced in strength since the apparent strength of the second user's signal has been reduced.

One form of adaptive smart antenna processing is referred to as linear adaptive smart antenna processing. In a linear adaptive smart antenna processing system, the signal from each antenna in the array is first amplified and phase shifted. The resultant signals are then added together to form a signal that may be viewed as being generated by a "virtual" antennae that enhances signals from a specific location within the cell while attenuating signals from other locations. The amplification factors and phase shifts determine the acceptance pattern for the virtual antenna. Similarly, a signal can be preferentially beamed to a localized region in the cell by generating an amplified and phase shifted signal from that signal to be applied to each of the antennae.

Since each user could be at a different location, a set of parameters is associated with each user. These parameters determine the phase shifts and amplification factors used in communicating with that user. The parameter set defines a "downlinking" set of phase shifts and amplification factors for use in communications from the BS to the cellular user and an "uplinking" set of phase shifts and amplification factors for use in communications from the cellular user to the BS. In general, these parameters can be determined "experimentally" for each user by searching the space of possible phase shifts and amplifications for the set that provides the best signal quality for that user. Since users and interference sources move and the environment changes with time, the process must be repeated at regular intervals.

There is a considerable investment in digital cellular units that employ CDMA. Accordingly, it would be advantageous to add the benefits of adaptive smart antenna processing to such systems without requiring that the cellular users obtain new equipment or reprogram existing cellular telephones. Ideally, only those BSs requiring additional capacity would need to be altered by introducing antennae arrays and the associated signal processing hardware. Hence, any method for evolving existing CDMA systems to combined CDMA-adaptive smart antenna processing systems should not require any new features in the existing cellular handsets.

The uplinking parameters for receiving a signal from a cellular user can be determined without the involvement of the cellular user. For example, the uplinking parameters may be determined at the BS by searching for the set of phase shifts and amplification factors that provide the best reception for the user in question. Several methods are known for determining the phase shifts and amplification factors that optimize the signals received at the BS, and hence, these methods will not be discussed in detail here. The reader is referred to U.S. Pat. Nos. 5,515,378 and 5,642,353 entitled "SPATIAL DIVISION MULTIPLE ACCESS WIRELESS COMMUNICATION SYSTEMS", to Roy, et al., based on methods that use the direction of arrival of the signal from the cellular user. U.S. Pat. Nos. 5,592,490 entitled "SPECTRALLY EFFICIENT HIGH CAPACITY WIRELESS COMMUNICATION SYSTEMS", to Barratt, et al., and 5,828,658 entitled "SPECTRALLY EFFICIENT HIGH CAPACITY WIRELESS COMMUNICATION SYSTEMS WITH SPATIO-TEMPORAL PROCESSING", to Ottersten, et al., describe methods based on spatial and spatio-temporal signatures, respectively. U.S. Pat. No. 5,989,470 entitled "METHOD AND APPARATUS FOR DECISION DIRECTED DEMODULATION USING ANTENNA ARRAYS AND SPATIAL PROCESSING", to Barratt, et al., describes a decision directed reference signal based method. These patents are hereby incorporated by reference.

If communications from the BS to the cellular user are performed at the same frequency as those from that user to the BS, then the downlinking parameters can be readily computed from the uplinking parameters. This computation also requires calibration data related to the various electronic components in the signal amplification paths and the characteristics of the antennae. Unfortunately, CDMA systems that conform to the IS-95 standard use different frequencies for the donwlinking and uplinking communications with each user. As a result, the optimum downlinking parameters cannot in general be readily determined without some involvement by the cellular handset.

Broadly, it is the object of the present invention to provide an improved method for operating an adaptive smart antenna processing-CDMA cellular telephone system to determine the downlinking signal processing parameters.

It is another object of the present invention to provide a method for determining the downlinking signal processing parameters without requiring that any new features be added to existing CDMA cellular handsets.

These and other objects of the present invention will become apparent to those skilled in the art from the following detailed description of the invention and the accompanying drawings.

SUMMARY OF THE INVENTION

The present invention is a method for operating a first base station (BS) in a cellular communication system that includes a plurality of BSs for transmitting information to a subscriber unit (SU). The information is included in a downlink signal sent from the first BS to the SU. The BS includes an array of antennae that is used to send the downlink signal to the SU. Each antenna is coupled to a signal processing circuit that generates an antenna signal for that antenna by processing the downlink signal. The processing depends on a weight set that is utilized in generating individual signals to be sent on individual antennae in the array of antennae. The weight set depends on the location of the SU relative to the array of antennae. The cellular communication system includes at least one protocol in which the SU generates a report signal indicative of the signal quality received by the SU when the first BS transmits a pilot downlink signal. The method of the present invention includes a method for determining the weight set corresponding to the SU. In the method of the present invention, the first BS transmits a plurality of pilot downlink signals to the SU, each pilot downlink signal being processed with a different weight set than that used to process the other pilot downlink signals. A report signal generated by the SU is received for at least two of the pilot downlink signals. The weight set is assigned for the SU based on a comparison of the received report signals. In one embodiment of the present invention, a first one of the pilot downlink signals includes a first identifier, and a second of the pilot downlink signals includes a second identifier that is different from said first identifier. The first and second identifiers identify first and second BSs, wherein the second base station is preferably displaced from the first base station by a distance sufficient to assure that the pilot downlink signal transmitted by the first base station and containing the second identifier will not interfere with communications between the second BS and the SUs currently communicating with the second BS. Embodiments of the present invention that integrate handoff with weight determination can also be constructed. In such systems, the SU also receives a third pilot downlink signal from a second BS. The SU generates and transmits one of the report signals indicating the signal strength of the third pilot downlink signal to the first BS. The first BS determines whether to handoff the SU to the second BS based on the signal strengths reported for the first, second, and third pilot signals. The method of the present invention can be practiced within existing CDMA cellular standards such as the IS-95 standard.

DETAILED DESCRIPTION OF THE INVENTION

Figure 1:
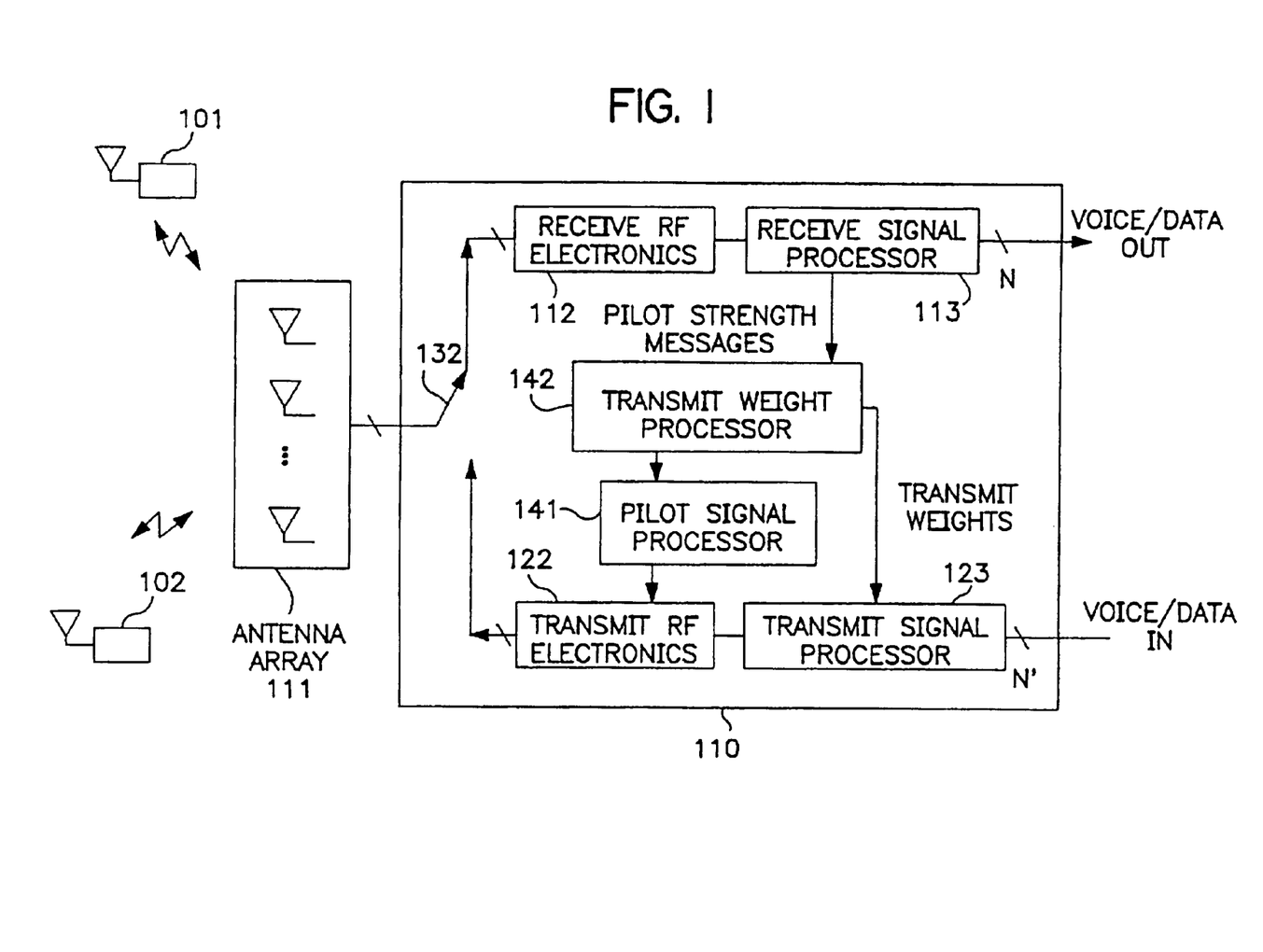
FIG. 1 is a block diagram of the signal-processing portion of a BS employing an antennae array to communicate with a number of cellular users.

The manner in which the present invention obtains its advantages may be more easily understood with reference to FIG. 1. FIG. 1 is a block diagram of the signal-processing portion 110 of a BS employing an antennae array 111 to communicate with a number of cellular users. Exemplary users are shown at 101 and 102. The signals from the antennae are coupled to RF receiving circuit 112. A "Switch" 132 determines whether the antennae are connected to receiving circuit 112 or transmitting circuit 112. RF receiving circuit 112 down converts the RF signal from each antenna in array 111 from the uplink RF frequency and digitizes the base-band signal to provide an in phase and quadrature signal to receive signal processor 113 for each antenna and stores those values in memory. The in phase signal digitized at time t for the $i^{th}$ antenna is denoted by $I_i(t)$, and the quadrature signal by $Q_i(t)$ in the following discussion. The base-band signal is typically over sampled to assure that the errors introduced by the digitization do not contribute significantly to the overall error rate.

As noted above, the receive signal processor may be viewed as a processor that constructs a virtual signal for each user that optimally recovers the signal sent by that user with as much gain as possible while rejecting the other users and interferes as much as possible. The receive signal processor generates each virtual signal by forming a weighted sum of the signals from each of the antenna. To simplify the notation in the following discussion, the signal from the $i^{th}$ antenna at time t will be denoted by $z_i(t)=I_i(t)+jQ_i(t)$. Here, $z_i(t)$ is a complex values from constructed from the inphase and quadrature signals. $I_i(t)$ and $Q_i(t)$, respectively, generated from the $i^{th}$ antenna at time t. The receive signal constructed for the $n^{th}$ user at time t is given by $$^{R}S_n(t) = \sum_{i=1}^{M} {}^{R}W_{n,i} z_i(t) \tag{1}$$

Here, the coefficients, $^{R}W_{n,i}$, are a set of complex valued reception weights and M is the number of antennae in the array. Each weight is equivalent to the amplification factor and phase shift to be applied to one of the antenna signals.

As noted above, the receive signal processor computes the receive weights to optimize the reception of each of the users. In general, the weights must be recomputed periodically, since the location of each user changes with time as do the background interference sources.

The transmission process is similar to the reception process. The individual voice/data signals are input to a transmit signal processor 123 that generates the signals to be sent to each antenna element. The m$^{th}$ antenna signal at time t is given by $$z_m(t) = \sum_{n=1}^{N'} {}^T W_{m,n} {}^T S_n(t) \qquad (2)$$

Here, the coefficients ${}^T W_{m,n}$ are a set of complex values transmission weights, and ${}^T S_n(t)$ is the signal to be transmitted to the n$^{th}$ user at time t. N' denotes the number of outbound channels. In general, there is one such channel per SU that is to receive a signal. In addition, there may be other channels such as the pilot channels discussed below. The antennae signals are then upconverted to the downlink RF frequency and transmitted from antenna array 111.

As noted above, the optimum transmission weight matrix cannot be readily computed from the set of reception weights for a user if the uplink and downlink RF frequencies are different. In the present invention, the optimal transmission weights for any given user are obtained by utilizing a feedback mechanism. The BS tires various sets of candidate weights and obtains feedback from the users with respect to the quality of signal received by that user. In cellular systems that conform to the IS-95 CDMA standard and its later modifications, the present invention provides a mechanism for testing weights and receiving feedback without introducing any new protocols that would require changes to the equipment employed by the users.

The preferred embodiment of the present invention utilizes the feedback mechanism that is set up for assisting the BSs in performing handoffs. Cellular CDMA systems that conform to the above-identified standards employ SU feedback for operations such as power control and handoff. A SU cannot be handed off to a new BS until the SU is receiving an adequate signal from the new BS. Hence, protocols have been established for the SU to report the signal strength or signal quality it is receiving from each BS to aid the BS in making handoff decisions.

These mechanisms use signals sent on predetermined pilot channels. For example, in the IS-95 CDMA standard, a BS transmits a pilot channel at all times on each active carrier. The code used to implement the pilot channel within the CDMA scheme is generated from a long pilot pseudo-noise (PN) sequence by picking a time offset into the PN sequence that uniquely identifies the BS.

As noted above, handoffs in CDMA systems are typically SU-assisted. A SU may make measurements of signal quality of one or more BSs, and report these measurements to the BS with which it is currently communicating. There are many possible measures of signal quality. The present invention does not depend on the specific choice of signal quality measurement. Examples of signal quality measurements known to those skilled in the art include the energy per bit divided by the noise plus interference spectral density ($E_b/N_O$), the received signal strength indication (RSSI), the signal-to-interference-plus-noise ratio, (SINR), and the bit error rate. The SU measurements and the measurement reports may be carried out autonomously, or at the request of the BS.

The preferred embodiment of the present invention employs the existing SU feedback facilities in a novel manner by using pilots not normally associated with a given BS to provide the feedback needed to determine the optimum transmission weights at the BS. To simplify the following discussion, the present invention will be described in terms of an implementation that utilizes the IS-95 CDMA air interface standard. It will be obvious to those skilled in the art from the following discussion that other standard feedback protocols may also be used without deviating from the teachings of the present invention.

The above-described standard implements a protocol known as a Pilot Measurement Request Order Message (PMROM). When a BS sends a PMROM on the pilot channel, the SU responds with a Pilot Strength Measurement Message (PSMM) that contains a measurement of the signal strength of the pilot channel identified in the PMROM as measured at the SU. In the present invention, the BS sends signals on the pilot channel in question using a particular set of transmit weights consisting of an amplitude and phase component for each antenna. These weights must be maintained for a time sufficient to allow the SU to complete its measurement. Referring again to FIG. 1, the BS preferably includes a pilot signal processor 141 that generates the pilot signals to be fed to each of the antennae in the antennae array. The communicating SUs then respond with a Pilot Strength Measurement Message (PSMM) which is received by a transmit weight processor 142. The BS notes the PSMMs from the communicating SUs, then repeats the PMROM with a different set of transmit weights. The BS may also send multiple PMROMs with the same transmit weight set to obtain a time average of signal quality or signal strength measurements. Preferably, the BS cycles through all of the tests sets of transmission weights; however, the BS can make decisions based on a partial set of weights as well. Once the BS has cycled through all test sets of transmit weights and received measurements information from all communicating SUs, it determines the best set of transmit weights for transmitting signals from the BS to each SU. It should be noted that the BS will be transmitting other information, i.e., voice and/or data to each user on the appropriate channel during this optimization procedure. The weights used for those transmissions are preferably the best current estimate for the weight set corresponding to each user. Hence, in the preferred embodiment of the present invention, each time a candidate weight set is found to be better that the current weight et for a user, the current weight set is updated immediately rather than waiting for the entire set of candidate weights set to be examined.

This entire optimization procedure is then repeated at prescribed intervals. The interval time is typically a function of the degree of environmental variation in the system. The procedure will be repeated more frequently in high mobility CDMA systems than in CDMA systems in which the SUs are non-moving. The IS-95 standard guarantees that an SU will respond to a PMROM with a PSMM within 0.2s.

In environments in which the re-calculation interval is short, systems that test a number of weight sets simultaneously are preferred. Embodiments in which multiple weight sets may be tests at the same time can be constructed by using the mechanisms normally used to implement hand-offs between BSs or between sectors in the same BS.

Each BS has a pilot channel defined by a pilot code that is associated with that BS. An SU monitors a number of different sets of pilot channels. According to the IS-95 standard, the SU monitors four sets of pilot channels, the Active Set, the Candidate Set, the Neighbor Set, and the Remaining Set.

The Active Set consists of one or more pilot channels associated with the Forward Traffic Channels assigned to the SU. Each pilot channel in the Active set corresponds to a BS with which the SU is actively communicating. Normally there will be only one pilot channel in the Active Set; however, there can be additional pilot channels in the Active Set during handoffs. In systems conforming to the IS-95 standard, a forward traffic channel is initially assigned to the SU and the Active Set is initialized to contain only the pilot associated with that forward channel. Subsequently, the pilot channel(s) in the Active Set is defined in messages from a BS that is currently in the Active Set.

The Candidate Set corresponds to pilots received with sufficient strength by a SU to indicate that the associated forward traffic channels can be successfully received. According to the IS-95 standard, if the SU processes a Handoff Direction Message (HDM) that does not list a pilot in the current Active Set, and the handoff drop timer for that pilot has not expired, the SU will add the pilot to the Candidate Set. Hence, the current BS can load candidate pilots into the SU using conventional hand off messages without interrupting the current communications between the BS and the SU and without requiring that any new protocols be added to the SU.

The Neighbor Set corresponds to pilots that are not currently in the Active Set or the Candidate Set but are likely candidates for handoff. This set also utilizes different pilot codes from those in the Active Set. All other pilots that have been defined in communications with the BS on the current CDMA carrier are in the Remaining Set, which is also maintained by the SU.

Under normal operation, the SU will autonomously send a PSMM if one of 2 events occurs. The first event occurs when the strength of a Candidate Set pilot, Neighbor Set pilot, or Remaining Set pilot exceeds a prescribed threshold, and a PSMM reporting this information has not been sent since the last HDM received from the BS. The second event is triggered when a Candidate Set pilot exceeds an Active Set pilot in strength. Under normal operation, the first event may occur when the SU moves into range of a second BS to which it could be transferred in a hand off. The second event occurs when the candidate pilot indicates that the BS associated therewith might be a better choice for the active BS than one of the current BSs. Normally, the current BS uses these conditions to manage handoffs.

The present invention makes use of the observation that there are normally many more pilot codes defined in the IS-95 standard than those currently being used by the SU. The IS-95 standard defines 512 pilots. However, an SU is seldom within range of 512 BSs. Consider pilot channels used by BSs that are out of the range of the SU and the current BS or pilot channels that are not currently being used by any BS in the system. The current BS can utilize these pilot channels without interfering with the other BSs' operations. To simplify the following discussion, these pilots will be referred to as "test pilots". Hence, the current BS can utilize these test pilots to test weight sets by sending HDM messages to the SU defining these test pilots as members of the Candidate Set or one of the other sets discussed above. The SU will then treat the test pilots as pilots from BSs that it thinks are in its vicinity, since the SU has no way of determining whether or not a BS actually exists other than by receiving the pilot code associated with that BS.

In this embodiment of the present invention, different weights are used to transmit the different test pilots in the Candidate Set, Neighbor Set or Remaining Set pilots. When a set of weights is used to transmit a test pilot signal that satisfies one of the two events discussed above, the SU will transmit PSMMs for that test pilot, and hence, inform the BS of the signal strength corresponding to the corresponding set of weights. Based on the PSMMs reported by the SU, the BS can choose the best set of transmit weights to use for downlinking information to that SU.

It should also be noted that the above-described embodiment of the present invention provides a mechanism for integrating the handoff decision with the weight determination process. In a BS according to the present invention, a SU is ready for handoff when a pilot in the Candidate Set corresponding to a nearby BS is received better than the pilot for the current BS when the best set of weights is utilized to transmit the current BS's pilot. Hence, if all of the possible weight sets are utilized on test pilots and the best signal associated with a test pilot is worse than that of a pilot signal originating at a different BS, a handoff is indicated. If the best-received test pilot is better than the real pilot signals, then the weights associated with the best test pilot are applied to the downlink transmissions, including those for the current BSs pilot. In this case, the other real pilots will not exhibit a signal that is stronger than the pilot in the active set and communications will continue with the current BS. Hence, the present invention is completely compatible with normal handoff procedures and will not interfere with normal handoff.

It should be noted that if the neighboring BS is also a BS according to the present invention, that BS will be cycling through various sets of weights on its pilot channels for making determinations with respect to SUs in that BS's filed of influence. Hence, a SU communicating with the current BS will actually measure several pilot signals corresponding to the neighboring BS. Each of these pilots will also correspond to a weight set that can be used in the neighboring BS to communicate with the SU. When one of these is better than the current best pilot from its BS, a handoff will be indicated. The identity of the pilot providing the best signal will provide both the BS identity for handoff and an estimate of the best weight set in that BS to be used after handoff.

In some environments, it is advantageous to send the test pilots at reduced power to reduce power consumed by the weight testing or the interference generated by the test pilots. In such systems, the SU may not automatically send PSMMs, since the received strength of the test pilot will be insufficient to satisfy the above-described conditions. In such embodiments, the BS explicitly request the PSMMs from the SU by issuing a PMROM.

One technique utilized in current cellular systems to increase capacity is to divide the cell into sectors. Each sector may be viewed as a separate cell with handoffs being performed between sectors. Accordingly, the term "Base Station" as used herein is deemed to include sectors with one BS. Some CDMA cellular systems support a functionality know as "soft handoff" in which the SU begins communications with a new BS without interrupting communications with the old BS. There is also a related functionality referred to as "softer handoff", wherein the SU simultaneously communicates with several sectors of the same BS while changing connection from one sector to another. These handoff protocols require a significant amount of control channel bandwidth. The use of antenna arrays in which each user is addressed with a different weight set reduces the frequency of soft and softer handoffs. As a result, control channel bandwidth is freed. This additional bandwidth can be used to perform the integrated signaling for weight determinations and handoffs.

Embodiments of the present invention that manage the engineering trade-off between the amount of control channel bandwidth available to perform signaling and the downlink weight determinations may also be constructed. If control channel bandwidth is plentiful, then a long list of test pilots may be employed, with the transmit weights for each test pilot chosen to produce a highly directive radiation pattern. Such a highly directive pattern will tend to maximize the downlink antenna power gain. If, on the other hand, control channel bandwidth is scarce, a short list of test pilots may be employed, with the transmit weights for each test pilot being chosen to produce a relatively broad radiation pattern. A broad radiation pattern will have relatively lower power gain, but its performance will also be much less sensitive to movement of the SU as well as changes in the environment and SU location. As a result, the feedback update rate when broad radiation patterns are employed can be much lower with no appreciable change in performance, reducing the load on the control channel.

The combination of SU feedback and adaptive weight determination via a combined protocol also enables temporally iterative techniques for achieving higher downlink directivity gains not possible with sectorization or switched beam systems. Initially, a short list of test pilots is used with the transmit weights for each test pilot being chosen to produce a relative broad radiation pattern. By using a small set of test pilots with broad radiation patterns initially, a candidate for best test pilot can be quickly determined. Upon identifying which of these broad patterns is best, a new set of candidates having weights corresponding to successively more and more directive radiation patterns is then employed until the transmit weights which yield maximum gain are determined.

Specific methods that may be adapted to generate weight sets that may be used as candidate weight sets in the present invention are taught in U.S. Pat. No. 6,154,661 entitled "TRANSMITTING ON THE DOWNLINK USING ONE OR MORE WEIGHT VECTORS DETERMINED TO ACHIEVE A DESIRED RADIATION PATTERN" to Goldburg, and U.S. Pat. No. 6,185,440 entitled "METHOD FOR SEQUENTIALLY TRANSMITTING A DOWNLINK SIGNAL FROM A COMMUNICATION STATION THAT HAS AN ANTENNA ARRAY TO ACHIEVE AN OMNI-DIRECTIONAL RADIATION" to Barratt, et al.. These patent applications are hereby incorporated by reference.

The embodiments of the present invention described above have used adaptive smart antenna processing for communications in both directions with respect to the user. However, it will be obvious to those skilled in the art from the preceding discussion that the present invention may also be practiced in systems in which adaptive smart antenna processing is only implemented in the downlink direction.

The above-described embodiments of the present invention have been described in terms of pure "spatial" processing. That is, the signal values generated for time t according to Eqs. (1) and (2) depend only on signals at the specific time, t. Consider a signal environment in which signals generated by a SU reach the base station via different paths. For example, a first portion of the signal radiated by that SU might reach the BS along the direct path between the SU and the base station while a second portion of the signal reaches the BS by traveling in a different direction and then bouncing off of an object such as a building. In general, the different paths will have significantly different path lengths; hence, the signal arriving along one of the paths will be delayed compared to the signal arriving by the direct path. Ideally, the BS would like to combine these two signals so as to increase the received power from the SU. To do this, the BS must combine signal values from different times.

This type of temporal processing may also be practice with the present invention. In systems that provide spatio-temporal processing, Eqs. (1) and (2( discussed above are generalized, respectively, as follows:

$$^R S_n(t_k) = \sum_{j=-K_1}^{K_2} \sum_{i=1}^{M} {^R W_{n,i,j}} z_i(t_{k+j}) \text{ and} \tag{3}$$

$$z_m(t_k) = \sum_{j=-K_3}^{K_4} \sum_{n=1}^{N'} {^T W_{m,n,j}} {^T S_n(t_{k+j})} \tag{4}$$

Here, the three dimensional weight sets, $^R W_{m,i,j}$ and $^T W_{m,n,j}$, are the weight sets that must be determined for each user. The values of $K_1$–$K_4$ depend on the particular implementation of the temporal processing. While Eqs. (3) and (4) are somewhat more complex than Eqs. (1) and (2), and the number of weights to be determined is significantly greater, the underlying weight set determination process is substantially the same. Here, the $t_k$, where k is an integer, denote the discrete times at which the antennae signals are measured or generated. Hence, it will be appreciated that the present invention may be utilized to determine these weights as well.

The above-described embodiments of the present invention utilize linear adaptive smart antenna processing, that is, the parameters to be determined are simple weights to be used in combining signal values. However, it will be obvious to those skilled in the art from the preceding discussion that the present invention may be applied in any situation in which an optimization parameter that affects quality is to be determined by feedback from the SUs. Accordingly, the term "weight set" as used herein is deemed to include any processing parameter utilized in combining the antenna signals to provide a signal indicative of the signal sent by a SU in the uplink direction or parameter used to process a signal to be sent to a SU so as to generate signals to be transmitted on the various antennae in an array of antennae.

The embodiments of the present invention discussed above have utilized protocols implemented in specific CDMA systems. However, it will be obvious to those skilled in the art from the preceding discussion that the present invention can be practiced in any system that defines a command in which a signal is sent on the relevant transmission frequency and the SU responds with a measurement of the signal quality measured by the SU on a predetermined frequency. Accordingly, the term pilot signal is deemed to include any signal whose quality is measured and reported by the BS.

Various modifications to the present invention will become apparent to those skilled in the art from the foregoing description and accompanying drawings. Accordingly, the present invention is to be limited solely by the scope of the following claims.

What is claim is:

1. A method to determine an antennae array weight set corresponding to a subscriber unit (SC) for cellular communications between the SU and a first base station (BS) of a system, the system including the first BS and a number of other base stations, the method comprising:

transmitting a plurality of test pilot downlink signals from the first BS to the SU, each test pilot downlink signal processed with a different weight set than the other test pilot downlink signals, at least one of the plurality of the test pilot downlink signals comprising a CDMA pilot signal associated with the first BS, and at least one of the plurality of test pilot downlink signals comprising a CDMA pilot signal associated with one of the other, non-neighboring base stations;

receiving a report signal from the SU for at least one of the test pilot downlink signals; and selecting a weight set from the plurality of weight sets based, at least in part, on the received report signal.

2. The method of claim 1, wherein transmitting the pilot signal associated with the first BS further comprises transmitting a CDMA pilot downlink signal from the first BS to the SU, wherein the CDMA pilot downlink signal includes a first identifier identifying the first BS.

3. The method of claim 2 wherein one of said test pilot downlink signals includes a second identifier that is different from said first identifier, the second identifier identifying a second BS, the second BS comprising one of the other base stations in the system.

4. The method of claim 3 wherein said second BS is located from said first BS by a distance sufficient to assure that transmission from the first BS to the SU of said one test pilot signal including the second identifier will not interfere with communications between said second BS and SUs currently communicating with said second BS.

5. The method of claim 3, further comprising:

receiving a CDMA pilot downlink signal including the second identifier from the second BS, said SU generating and transmitting one of said report signals to said first BS, said report signal indicating the signal strength of said CDMA pilot downlink signal from the second BS; and determining whether to handoff said SU to said second BS based on the signal strengths reported for said CDMA pilot signal transmitted by the first BS, said one test pilot signal including the second identifier transmitted by the first BS, and said CDMA pilot signal transmitted by the second BS.

6. The method of claim 1 wherein said cellular communications conform to a cellular standard in which each SU automatically monitors each of a plurality of CDMS pilot downlink signals in a set of CDMA pilot downlink signals, said test pilot signals selected from the set of CDMA pilot downlink signals.

7. The method of claim 6 wherein said cellular standard is IS-95 and wherein said set of CDMA pilot downlink signals comprises one of a Candidate Set, a Neighbor Set, and a Remaining Set as defined in that standard.

8. The method of claim 1, further comprising:

determining whether to hand off the SU to a second BS based, at least in part, on the received report signal, the second BS comprising one of the other base stations in the system.

9. The method of claim 8, further comprising:

sending an estimate of the weight set to be used after handoff to the second BS.

10. An article of manufacture containing a machine-readable medium having stored thereon data representing sequences of instructions which, when executed by a processor, cause the processor to perform operations comprising:

transmitting a plurality of test pilot signals from a first base station (BS) of a system to a subscriber unit (SU), the system including the first BS and a number of other base stations, each test pilot downlink signal processed with a different weight set from the other test pilot downlink signals, at least one of the plurality of the test pilot downlink signals comprising a CDMA pilot signal associated with the first BS, and at least one of the plurality of test pilot downlink signals comprising a CDMA pilot signal associated with one of the other, non-neighboring base stations;

receiving a report signal from the SU for at least one of the test pilot downlink signals; and selecting a weight set from the plurality of weight sets based, at least in part, on the received report signal.

11. The article of claim 10, wherein the instructions, when executed by the processor, cause the processor to perform operations wherein transmitting the pilot signal associated with the first BS further comprises transmitting CDMA pilot downlink signal from the first BS to the SU, wherein the CDMA pilot downlink signal includes a first identifier identifying the first BS.

12. The article of claim 11, wherein one of the test pilot downlink signals includes a second identifier that is different from the first identifier, the second identifier identifying a second BS, the second BS comprising one of the other base stations in the system.

13. The article of claim 12, wherein the second BS is displaced from the first BS by a distance sufficient to assure that transmission from the first BS to the SU of said one test pilot signal including the second identifier will not interfere with communications between the second BS and SUs currently communicating with the second BS.

14. The article of claim 12, wherein the instructions, when executed by the processor, cause the processor to perform operations further comprising:

receiving a CDMA pilot downlink signal including the second identifier from the second BS, the SU generating and transmitting one of the report signals to the first BS, the report signal indicating the signal strength of the CDMA pilot downlink signal from the second BS; and determining whether to handoff the SU to the second BS based on the signal strengths reported for the CDMA pilot signal transmitted by the first BS, said one test pilot signal including the second identifier transmitted by the first BS, and the CDMA pilot signal transmitted by the second BS.

15. The article of claim 10, wherein cellular communications between the SU and first BS conform to a cellular standard in which each SU automatically monitors each of a plurality of CDMA pilot downlink signals in a set of CDMA pilot downlink signals, the test pilot signals selected from the set of CDMA pilot downlink signals.

16. The article of claim 15, wherein the cellular standard is IS-95 and wherein the set of CDMA pilot downlink signals comprises one of a Candidate Set, a Neighbor Set, and a Remaining Set.

17. The article of claim 10, having stored thereon data representing sequences of instructions which, when executed by a processor, cause the processor to further perform the operation comprising:

determining whether to hand off the SU to a second BS based, at least in part, on the received report signal, the second BS comprising one of the other base stations in the system.

18. The article of claim 17, having stored thereon data representing sequences of instructions which, when executed by a processor, cause the processor to further perform the operation comprising:

sending an estimate of the weight set to be used after handoff to the second BS.

19. A method to determine an antennae array weight set corresponding to a subscriber unit (SU) for communications between the SU and a first base station (BS) of a system, the system including the first BS and a number of other base stations, the method comprising:

transmitting a plurality of test pilot downlink signals from the first BS to the SU, each test pilot downlink signal processed with a different weight set than the other test pilot downlink signals, at least one of the plurality of test pilot downlink signals comprising a pilot signal associated with the first BS, and at least one of the plurality of test pilot downlink signals comprising a pilot signal associated with one of the other base stations that is typically used for at least one of controlling power and base station hand off, the one of the other base stations being sufficiently spatially separated from the first base station to not produce interference between the first BS and the SU;

receiving a report signal from the SU for at least one of the pilot downlink signals; and determining the weight set corresponding to the SU based on the report signal.

20. The method of claim 19 wherein transmitting the pilot signal associated with the first BS further comprises transmitting a pilot downlink signal from the first BS to the SU, wherein the pilot downlink signal includes a first identifier identifying the first BS.

21. The method of claim 20 wherein one of said test pilot downlink signals includes a second identifier that is different from said first identifier, the second identifier identifying a second BS, the second BS comprising one of the other base stations in the system.

22. The method of claim 21, further comprising:

receiving a pilot downlink signal including the second identifier from the second BS, said SU generating and transmitting one of said report signals to said first BS, said report signal indicating the signal strength of said pilot downlink signal from the second BS; and determining whether to handoff said SU to said second BS based on the signal strengths reported for said pilot signal transmitted by the first BS, said one test pilot signal including the second identifier transmitted by the first BS, and said pilot signal transmitted by the second BS.

23. The method of claim 19 wherein said communications conform to a cellular standard in which each SU automatically monitors each of a plurality of pilot downlink signals in a set of pilot downlink signals, said test pilot signals selected from the set of pilot downlink signals.

24. The method of claim 23 wherein said cellular standard is IS-95 and wherein said set of pilot downlink signals comprises one of a Candidate Set, a Neighbor Set, and a Remaining Set as defined in that standard.

25. The method of claim 19, further comprising:

determining whether to hand off the SU to a second BS based, at least in part, on the received report signal, the second BS comprising one of the other base stations in the system.

26. The method of claim 25, further comprising:

sending an estimate of the weight set to be used after handoff to the second BS.

27. An article of manufacture containing a machine-readable medium having stored thereon data representing sequences of instructions which, when executed by a processor, cause the processor to perform operations comprising:

transmitting a plurality of test pilot downlink signals from a first base station (BS) of a system to a subscriber unit (SU), the system including the first BS and a number of other bases stations, at least one of the plurality of test pilot downlink signals comprising a pilot signal associated with the first BS, and at least one of the plurality of test pilot downlink signals comprising a pilot signal associated with one of the other base stations that is typically used for at least one of power control and base station hand off, each test pilot downlink signal processed with a different weight set from the other test pilot downlink signals, the one of the other base stations being sufficiently spatially separated from the first base station to not produce interference between the first BS and the SU;

receiving a report signal from the SU for at least one of the test pilot downlink signals; and determining the weight set corresponding to the SU based on the report signal.

28. The article of claim 27, wherein the instructions, when executed by the processor, cause the processor to perform operations wherein transmitting the pilot signal associated with the first BS further comprises transmitting a pilot downlink signal from the first BS to the SU, wherein the pilot downlink signal includes a first identifier identifying the first BS.

29. The article of claim 28, wherein one of the test pilot downlink signals includes a second identifier that is different from the first identifier, the second identifier identifying a second BS, the second BS comprising one of the other base stations in the system.

30. The article of claim 29, wherein the instructions, when executed by the processor, cause the processor to perform operations further comprising:

receiving a pilot downlink signal including the second identifier from the second BS, the SU generating and transmitting one of the report signals to the first BS, the report signal indicating the signal strength of the pilot downlink signal from the second BS; and determining whether to handoff the SU to the second BS based on the signal strengths reported for the first, second, and third pilot signal transmitted by the first BS, said one test pilot signal including the second identifier transmitted by the first BS, and said pilot signal transmitted by the second BS.

31. The article of claim 27 wherein communications between the SU and first BS conform to a cellular standard in which each SU automatically monitors each of a plurality of pilot downlink signals in a set of pilot downlink signals, the test pilot signals selected from the set of pilot downlink signals.

32. The article of claim 27, wherein the cellular standard is IS-95 and wherein the set of pilot downlink signals comprises one of a Candidate Set, a Neighbor Set, and a Remaining Set as defined in that standard.

33. The article of claim 27, further comprising instructions which, when executed by a processor, cause the processor to further perform the operation comprising:

determining whether to hand off the SU to a second BS based, at least in part, on the received report signal, the second BS comprising one of the other base stations in the system.

34. The article of claim 33 further comprising instructions which, when executed by a processor, cause the processor to further perform the operation comprising:

sending an estimate of the weight set to be used after handoff to the second BS.

* * * * *